March 24, 1931.   J. N. BROST   1,798,061
VACUUM CONVEYER
Filed Dec. 12, 1929
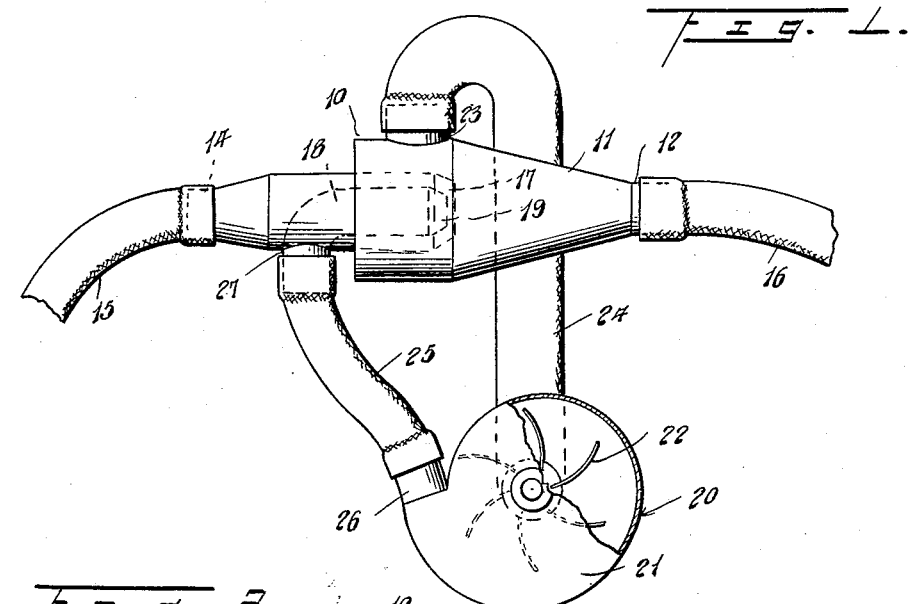
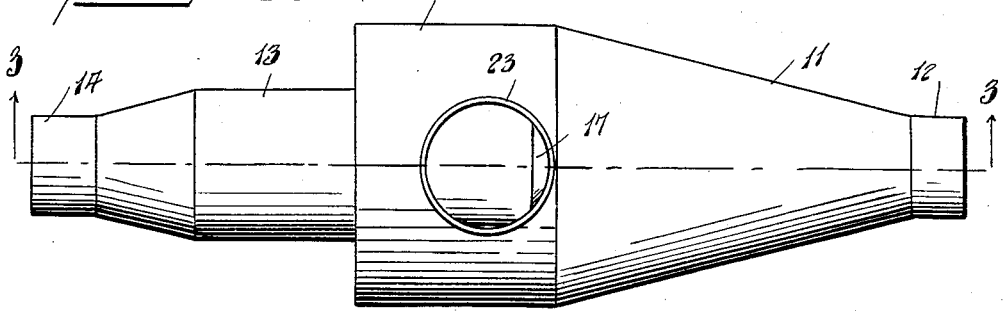
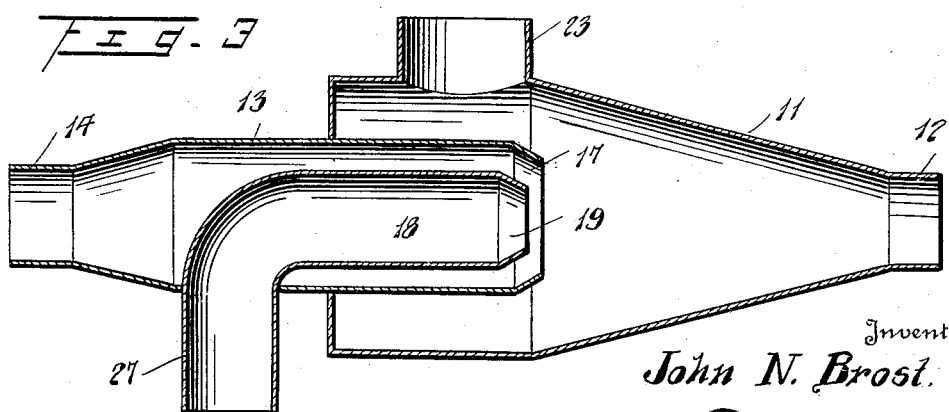
Inventor
John N. Brost.

Patented Mar. 24, 1931

1,798,061

UNITED STATES PATENT OFFICE

JOHN N. BROST, OF NASHUA, MONTANA

VACUUM CONVEYER

Application filed December 12, 1929. Serial No. 413,628.

This invention relates to a vacuum conveyer for grain or other fluent or granular material.

It is aimed to provide a novel construction utilizing both the suction and pressure in connection with the operation of the same fan or blower.

Another object is to provide a construction having concentric nozzles through one of which air is forced to create a vacuum, the latter being aided by withdrawal of air adjacent the other nozzle and discharge of the material by the vacuum against a vertex.

The more specific objects and advantages will become apparent from a consideration of the description following taken in connection with accompanying drawings illustrating an operative embodiment.

In said drawings:—

Figure 1 is a view of the apparatus in side elevation,

Figure 2 is a plan view of the structure, and

Figure 3 is a longitudinal sectional view taken on the line 3—3 of Figure 2.

Referring specifically to the drawings, 10 designates a drum which has a forward frusto-conical portion or vertex 11 terminating in a discharge nipple 12.

The material to be conveyed is adapted to pass through a pipe or nozzle 13 which is fastened partly within and partly without the drum 11, the rear end having a nipple 14 thereon. A pipe or hose 15, usually flexible, is attached to the nipple 14 and arranged at the source of the grain or other material to be conveyed and the nipple 12 has a pipe or hose 16 attached thereto, usually flexible, leading to the point of delivery.

Nozzle 13 has its discharge end 17 contracted as shown if desired although not necessary. Nozzle 13 is arranged coaxially with the drum 11 and also arranged coaxially therewith is a smaller nozzle 18, whose forward or discharge end 19 may be contracted if desired, although not necessary.

The device is used in association with a fan or blower designated 20. The casing of such blower or fan is shown at 21 and the fan proper is shown at 22. Rearwardly of the discharge end of nozzle 13, a nipple 23 is provided on the drum 11 and a pipe or flexible hose 24 may be attached to such nipple 23 and to the suction side of the blower 20 at the casing 21 while a flexible pipe or tube 25 is connected to the delivery nipple or side 26 of the blower 20 at the casing 21 and to the portion 27 of the nozzle 18 which extends exteriorly of nozzle 13 and in effect forms a nipple.

In operation, with the fan or blower 22 rotating, air within the device is evacuated or sucked through the pipe 24, through the casing 21 and discharged under pressure through the pipe 25, nozzle 18 and into the drum. This action creates a vacuum withdrawing the grain or material to be delivered through the pipe 15 and thence between the nozzles 18 and 13, discharging the same through the delivery end 17 against the vertex 11 slightly in the rear of the nipple 12 and thence discharging it through the nipple 12, pipe 16 to the place of delivery.

It will be realized that the air which leaves through the pipe 24 is derived through the nozzle 13 from the inlet end of the pipe 15 and that the jet of air discharged through nozzle 18 at the end 19 has such a high velocity that its inertia carries the air out of the nozzle 13.

It will be realized, that the device is exceedingly simple and capable of manufacture and handling at low cost. In fact the device may be used in connection with a truck or the like and the fan 22 connected so as to be operated by the motor of the truck and be used in the handling of grain or other material which a truck is adapted to haul or handle.

It will be obvious that pipe 24 may be dispensed with and the nipple 23 closed if a stronger action or jet of air is to be discharged through the nozzle 18 as when the conveyer is to be used to handle dust, mill feed, ashes or very light materials, it being realized in such event, that the air entering the blower is taken from the atmosphere and then blown through the pipe 25 into the drum 11 and through the pipe 16.

Attention is called to the fact that various changes may be resorted to provided they fall within the spirit and scope of the invention. For instance, the nipple 23 may be arranged at any desired location rearwardly of the outlet 17 of nozzle 13 and that the different nozzles and drum may be rectangular or of any other desired shape as well as round as shown.

I claim as my invention:—

1. A device of the class described having a drum through which material is adapted to be conveyed, a nozzle to supply material to the drum, a nozzle within the first mentioned nozzle, a blower means to evacuate air from within the drum and discharge the same under pressure through the second mentioned nozzle to draw material through the first mentioned nozzle, into and through the drum.

2. A device of the class described having a drum through which material is adapted to be conveyed, a nozzle to supply material to the drum, a nozzle within the first mentioned nozzle, a blower means to evacuate air from within the drum and discharge the same under pressure through the second mentioned nozzle to draw material through the first mentioned nozzle, into and through the drum, said drum having a constriction forwardly of the nozzle to be engaged by the material, said constriction and nozzles being coaxially arranged.

3. A device of the class described having a drum through which material is adapted to be conveyed, a nozzle to supply material to the drum, a nozzle within the first mentioned nozzle, a blower means to evacuate air from within the drum and discharge the same under pressure through the second mentioned nozzle to draw material through the first mentioned nozzle, into and through the drum, said drum having a constriction forwardly of the nozzle to be engaged by the material, said constriction and nozzles being coaxially arranged, and the outlet for the evacuation of air from the drum being located rearwardly of the outlet of the first mentioned nozzle.

4. A device of the class described having a drum through which material is adapted to be conveyed, a nozzle to supply material to the drum, a nozzle within the first mentioned nozzle, a blower means to evacuate air from within the drum and discharge the same under pressure through the second mentioned nozzle to draw material through the first mentioned nozzle, into and through the drum, said drum having a constriction forwardly of the nozzle to be engaged by the material, said constriction and nozzles being coaxially arranged, the outlet for the evacuation of the air from the drum being located rearwardly of the outlet of the first mentioned nozzle, the second mentioned nozzle extending through the first mentioned nozzle to provide a nipple for connection with the blower.

5. A device of the class described comprising a drum having a constriction adjacent the discharge end thereof, a nipple for connection with the suction side of a blower, a supply nozzle extending into the drum and arranged coaxially therewith and to discharge material against the constriction, and a second nozzle having a portion concentric with the first nozzle and a portion extending through the first nozzle, the latter portion being adapted for connection with the discharge side of a blower.

In testimony whereof I affix my signature.

JOHN N. BROST.